United States Patent [19]
Gnatowski et al.

[11] Patent Number: 5,378,544
[45] Date of Patent: Jan. 3, 1995

[54] WOOD COMPOSITES WITH LIGHT COLORED GLUE LINES

[75] Inventors: Marek J. Gnatowski, Coquitlam; Robert L. Pike, Vancouver; Douglas E. Rogerson, Richmond, all of Canada

[73] Assignee: Trus Joist MacMillan, a Limited Partnership, Boise, Id.

[21] Appl. No.: 56,497

[22] Filed: May 3, 1993

[51] Int. Cl.⁶ .................. B32B 21/08; B32B 27/42; B32B 31/12
[52] U.S. Cl. ...................... 428/529; 428/528; 156/307.4; 156/335
[58] Field of Search ................ 428/528, 529

[56] References Cited

FOREIGN PATENT DOCUMENTS 887132 11/1971 Canada .

OTHER PUBLICATIONS

"Infra-Red Spectra of Phenolic Resins" by Nakamura, N., Journal of Industrial Chemistry, vol. 60, No. 6, pp. 785–789 (1957).

Primary Examiner—P. C. Sluby
Attorney, Agent, or Firm—C. A. Rowley

[57] ABSTRACT

A composite wood product made from discrete wood particles secured together by a cured bisphenol A formaldehyde resin cured from an A-stage bisphenol A formaldehyde resin having an A-stage bisphenol A to formaldehyde mole ratio of 1 to between 2.5 and 4 and between 3 and 11% of caustic measured as sodium hydroxide based on the weight of resin solids. Preferably the resin will include 2 to 10% urea based on the resin solids. The cured bisphenol A formaldehyde resin secures the wood particles together to form a composite wood product having light colored glue lines that substantially corresponds in color with the wood so that the glue lines tend to be unnoticeable.

12 Claims, No Drawings

WOOD COMPOSITES WITH LIGHT COLORED GLUE LINES

FIELD OF THE INVENTION

The present invention relates to wood composites. More particularly the present invention relates to wood composites with light colored or unnoticeable glue lines.

BACKGROUND OF THE INVENTION

Normally wood composites, particularly those used for industrial or construction grade products made with phenol formaldehyde resins as the adhesive have glue lines that are dark color and clearly visible after consolidation.

It is known to produce wood composite products having light colored or unnoticeable glue lines by utilizing special adhesives. Isocyanate adhesives, for example, are employed particularly when steam pressing and/or high moisture content wood are used. The isocyanate resin on curing tends to be light in color and therefore unnoticeable in resultant product, however, uncured isocyanate resins do have toxic implications during the manufacture and under certain consolidating conditions. Isocyanates normally do not present a serious health problem when properly handled or contained. Composites made using isocynates such as methylene di-phenylene isocyanate (MDI) when subjected to ultra-violet (UV) radiation, darken significantly resulting in the glue line becoming more visible.

In Europe it is relatively common practice to use melamine formaldehyde as a bonding resin for the manufacture of wood composite boards. These melamine resins produce satisfactory product but are more expensive than phenol formaldehyde resins and have limited approval for structural use in North America. The acid curable melamine or phenol melamine or phenol melamine urea resins are not compatible with the alkaline phenol formaldehyde resins and thus require that the plant or production line be substantially dedicated to the use of melamine formaldehyde resins or alternatively dedicated to the use of phenol formaldehyde resin or in some manner ensure that melamine adhesive does not contaminate the phenol formaldehyde or vice versa.

It is known that light colored phenolic resins may be produced using bisphenol-A formaldehyde resin. In a paper entitled Infra-red Spectra of Phenolic Resins by Nakamura, published in the Journal of Industrial Chemistry, Vol. 60, No. 6, 1957, pp. 785–789, the production of light colored alcohol stage B phenolic resins from bisphenol A (BPA) is discussed and various parameters examined for the production of colorless bisphenol A type resin. The description teaches the use of 1% potassium hydroxide as the catalyst and that curing at 140° C. and above results in conversion of the resin to a dark yellow color. Thus, if used as an adhesive in conventional processes for producing lignocellulosic composite materials, wherein the temperature exceeds 140° C., the resultant glue lines would be expected to be dark yellow as opposed to being light colored and nondistinguishable from the natural wood color.

BRIEF DESCRIPTION OF THE PRESENT INVENTION

It is an object of the present invention to provide a system for manufacturing wood composite products which permits the formation of a product having light colored glue lines using a glue that is compatible with the conventional phenol formaldehyde resins normally used for the manufacture of wood composite products.

Broadly the present invention relates to a composite wood product and method of making same comprising a plurality of discrete wood particles secured together by a bisphenol A formaldehyde resin cured from an A-stage bisphenol A formaldehyde resin having an A-stage bisphenol A to formaldehyde molar ratio of 1 mole A-stage bisphenol A to between 2.5 to 4 moles of formaldehyde and between 3 and 11% caustic (measured as sodium hydroxide) based on the weight of the resin solids, said composite wood product having light colored glue lines substantially corresponding in color with the wood of said particles so that said glue lines tend to be unnoticeable.

Said bisphenol A formaldehyde may include 2–10% urea based on the weight of the resin solids.

Preferably said molar ratio of A-stage bisphenol A to formaldehyde will be in the range of 1 to 2.8–3.2.

Preferably said caustic will be present in the amount of 3–5% based on the weight of resin solids.

DESCRIPTION OF THE PREFERRED EMBODIMENTS

The term composite wood products as used throughout the disclosure and claims is intended to include conventional composite products such as wafer board strand, board strand or wafer type lumber products, etc. as well as laminated wood product such as plywood, laminated veneer lumber, fingerjointed products, etc.

It has been found that if a precursor comprising bisphenol A to formaldehyde in a molar ratio of 1 mole bisphenol A to between 2.5 and 4 moles of formaldehyde and containing 3 to 11% caustic measured as sodium hydroxide based on the weight of resin solids (preferably 3.5 to 5% caustic) is cooked under proper condition that a satisfactory resin having the required physical characteristics including color can be produced. Cooking should be at a temperature in the range of about 45° to 70° C. and for preferably less than about 8 hours to produce a resin preferably having a viscosity in the range of 110 to 150 centipoise (cp). Preferably the cook will be a two stage cook having an initial stage at a temperature of between 45° to 55° C. lasting up to about 3 hours followed by a final stage at a temperature about 20° C. higher than the temperature of the initial stage and lasting about the same length of time as the initial stage. The resulting resin is water soluble.

The resin as above described may be used directly as the binder in the wood composite, but it has been found that if urea is added to the resin, in amounts of 2 to 10% preferably 4 to 8% based on the weight of the resin solids, a lighter color, i.e. better wood watching, glue line could be achieved.

The water soluble resin so produced with or without urea is then applied to the wood elements to be used to form the composite product. These wood elements may be in the form of particles, wafers, strands, clipped veneer, veneer sheets, etc. The resin is applied in the amounts in the range of approximately 2 to 10% resin solids based on the dry weight of the wood, i.e. in the same amount as would normally be applied to obtain similar characteristics using a conventional phenol formaldehyde resin.

To maintain the colorless features of the glue lines of present invention and permit curing at temperatures above 140° C. it is preferred that the mole ratio of bisphenol A to formaldehyde be in the range of 1 mole bisphenol A to at least 2.5 and less than about 4 moles of formaldehyde and preferably in the range of about 1 mole bisphenol A to 2-3.2 moles of formaldehyde.

It is important to maintain the caustic content of the resin relatively low as compared to that normally used in the production of phenol formaldehyde resins. For this reason the caustic content measured as sodium hydroxide (NaOH) should be between 3 and 11% by weight of the resin solids and preferably the caustic measured as NaOH in the precursor or starting material will be 3.5 to 5%.

Sodium hydroxide has been used as the caustic but other suitable caustic material may also be satisfactory.

The water soluble bisphenol A formaldehyde resin should be cooked to the viscosity required for the particular application. For use with Douglas fir the adhesive will preferably have a viscosity in the range of about 110 to 150 centipoise (cp). This may be obtained by cooking at 65° to 70° C. for less than about 8 hours. It is important that the viscosity of the adhesive be matched with the wood, e.g., when the resin is to be used with Douglas fir 110-150 cp, however, if a more easily penetrated species is used, e.g., southern pine, a higher viscosity is better.

Water soluble bisphenol A formaldehyde resins produced as described above and applied to wood elements and cured in a press at temperatures (up to and exceeding 140° C., for certain periods of time) have been found to produce light colored glue lines that tend to be unnoticeable in the consolidated product.

Addition of 2 to 10% by weight of urea based on the resin solids, preferably 5 to 8% permits the production of a satisfactory composite using higher temperatures without unacceptable discoloration of the glue line. The urea tends to tint the set resin more to the yellow tone similar to wood color. If more than about 10% urea is used, the strength of the glue may be significantly impaired.

EXAMPLES

Eight different batches of A-stage bisphenol A formaldehyde (BPA-F) resins were cooked using the formulations and then cooking to the viscosity described in Table 1.

TABLE 1

| BPA* Resin Cook No. | Molar Ratio of BPA: Formaldehyde | NaOH % | Resin Visc. cp @ 25° C. | Resin Solids Content % | Resin Gel Time Minutes at 100° C. |
|---|---|---|---|---|---|
| BPA 1 | 1:3.5 | 1.5 | 175 | 42.5 | 25.0 |
| BPA 2 | 1:4.0 | 1.5 | 163 | 42.3 | 26.75 |
| BPA 3 | 1:4.5 | 1.5 | 160 | 43.2 | 28.5 |
| BPA 4 | 1:3.5 | 1.5 | 130 | 43.09 | 30.0 |
| BPA 5 | 1:3.5 | 1.5 | 160 | 42.25 | 28.5 |
| BPA 6 | 1:3.5 | 1.5 | 100 | 42.62 | 31.5 |
| BPA 7 | 1:3.0 | 1.5 | 108 | 42.03 | 32.5 |
| BPA 8 | 1:3.0 | 1.5 | 110 | 37.87 | 37.50 |
| P9** | 1:2.25*** | 1.5 | 193 | 39.5 | 20.0 |

*BPA = A-stage bisphenol A
**phenol formaldehyde resin as a control
***molar ratio of phenol to formaldehyde All the cooks were cooked from initial batch of components containing about 45 to 55% water (including the water added and the water content of the caustic—about 80 to 85% and of the formalin about 63%). The initial stage of the cooks were at temperature of 50° C. for two hours and the balance at between 65° and 70° C. for sufficient time to reach the desired or target viscosity.

When the resin was to be applied as an adhesive to Douglas fir a resin viscosity between 100-120 cp was found to perform best, i.e. better than the performance of a similar resins cooked to higher viscosity (e.g. as described above having a viscosity of about 170 cp) in that the bond formed was better, likely as a result of a proper degree of penetration of the resin into the wood. As above indicated with southern pine significantly higher resin viscosities may be better to ensure the desired penetration of the resin in the wood.

Tests conducted on the composite products produced using the water soluble bisphenol A formaldehyde resins of the present invention proved that the structural characteristics (modulus of elasticity (MOE), modulus of rupture (MOR), internal bond (IB)) of such composite products are generally equal to or better than those of similar composite products made using the conventional phenol formaldehyde resins.

All of the water soluble bisphenol A formaldehyde resins of the present invention when the composite was cured using microwave heating showed a much more even temperature profile than did those made with the conventional phenol formaldehyde resin i.e. the temperature at the centre of the heated billet was closer to the temperatures at the edge of the billet with resins of the present invention than when treating billets having a higher caustic as conventionally used phenol formaldehyde resin. The water soluble bisphenol A formaldehyde resins on curing to form the wood composite generate a temperature profile in the billet or mat that approaches very closely profiles obtained by heating a mat or billet containing no resin and having a moisture content of about 8-15%.

Microwave pressing also resulted in significantly more even the density profiles for billets made using the bisphenol A resin than those from similar billets made with conventional phenol formaldehyde resin. Plots of billet or consolidated product springback vs. press exit temperature showed a marked improvement (reduction) in springback when cured with microwave energy and bisphenol A resin as opposed to microwave energy and conventional phenol formaldehyde resin.

The bisphenol A formaldehyde resin always produce a lighter colored glue-line than the phenol formaldehyde resin and met the criteria for an acceptable color in the glue line tended to disappear.

Tests were also conducted using mixtures of phenol formaldehyde resin and bisphenol A formaldehyde resin of the invention.

It was also found that up to approximately 25% of the bisphenol A formaldehyde resin could be replaced with standard phenol formaldehyde resin and an acceptable light colored glue line be obtained for some wood species.

In another example of the present invention, 4% of urea was added to a hisphenol A phenol formaldehyde resin containing about 1.5% of sodium hydroxide and the resulting resin used as an adhesive to laminate three plys of wood veneer by curing under pressure at a temperature of 150° C. for 15 minutes. The resulting consolidated product had glue lines that were light golden in color, i.e., matched well with the color of the wood. Both the glue line and the extra adhesive that squeezed out from between the plies during the consolidation process had essentially the same light color. When a similar test was performed using a similar bisphenol A adhesive but without urea, the glue line exhibited the required golden or light yellow color to match the wood so that the glue line blended with the wood and became unnoticeable, however, the extra glue that exuded from the glue line during the curing operation turned a greenish color.

The above disclosure and examples have been directed to A-stage bisphenol A formaldehyde resins, but it will be apparent to those skilled in the art that similar results will likely be obtained by substituting suitable derivatives of bisphenol A for bisphenol A and it is intended that these suitable derivatives be included within the scope of the term bisphenol A as used in the disclosure and claims.

Having described the invention modifications will be evident to those skilled in the art without departing from the spirit of the invention as defined in the appended claims.

We claim:

1. A composite wood product comprising a plurality of discrete wood elements secured together by a cured bisphenol A formaldehyde resin cured from a water soluble bisphenol A formaldehyde resin having bisphenol A to formaldehyde molar ratio of 1 mole of A-stage bisphenol A to between 2.5 to 4 moles of formaldehyde and a caustic content measured as sodium hydroxide of 3 to 11% based on the weight of the resin solids, said composite wood product having light colored glue lines substantially corresponding in color with the wood.

2. A composite wood product as defined in claim 1 when said resin further includes 2 to 10% urea based on said weight of said resin solids.

3. A composite wood product as defined in claim 2 when said resin further includes 5 to 8% urea based on said weight of resin solids.

4. A composite wood product as defined in claim 1 wherein said caustic is sodium hydroxide and said caustic content is 3.5 to 5%.

5. A composite wood product as defined in claim 2 wherein said caustic is sodium hydroxide and said caustic content is 3.5 to 5%.

6. A composite wood product as defined in claim 3 wherein said caustic is sodium hydroxide and said caustic content is 3.5 to 5%.

7. A composite wood product as defined in claim 1 wherein said molar ratio of bisphenol A to formaldehyde is 1 to 2.8–3.2.

8. A composite wood product as defined in claim 2 wherein said molar ratio of bisphenol A to formaldehyde is 1 to 2.8–3.2.

9. A composite wood product as defined in claim 3 wherein said molar ratio of bisphenol A to formaldehyde is 1 to 2.8–3.2.

10. A composite wood product as defined in claim 4 wherein said molar ratio of bisphenol A to formaldehyde is 1 to 2.8–3.2.

11. A composite wood product as defined in claim 5 wherein said molar ratio of bisphenol A to formaldehyde is 1 to 2.8–3.2.

12. A composite wood product as defined in claim 6 wherein said molar ratio of bisphenol A to formaldehyde is 1 to 2.8–3.2.

* * * * *